Patented May 2, 1950

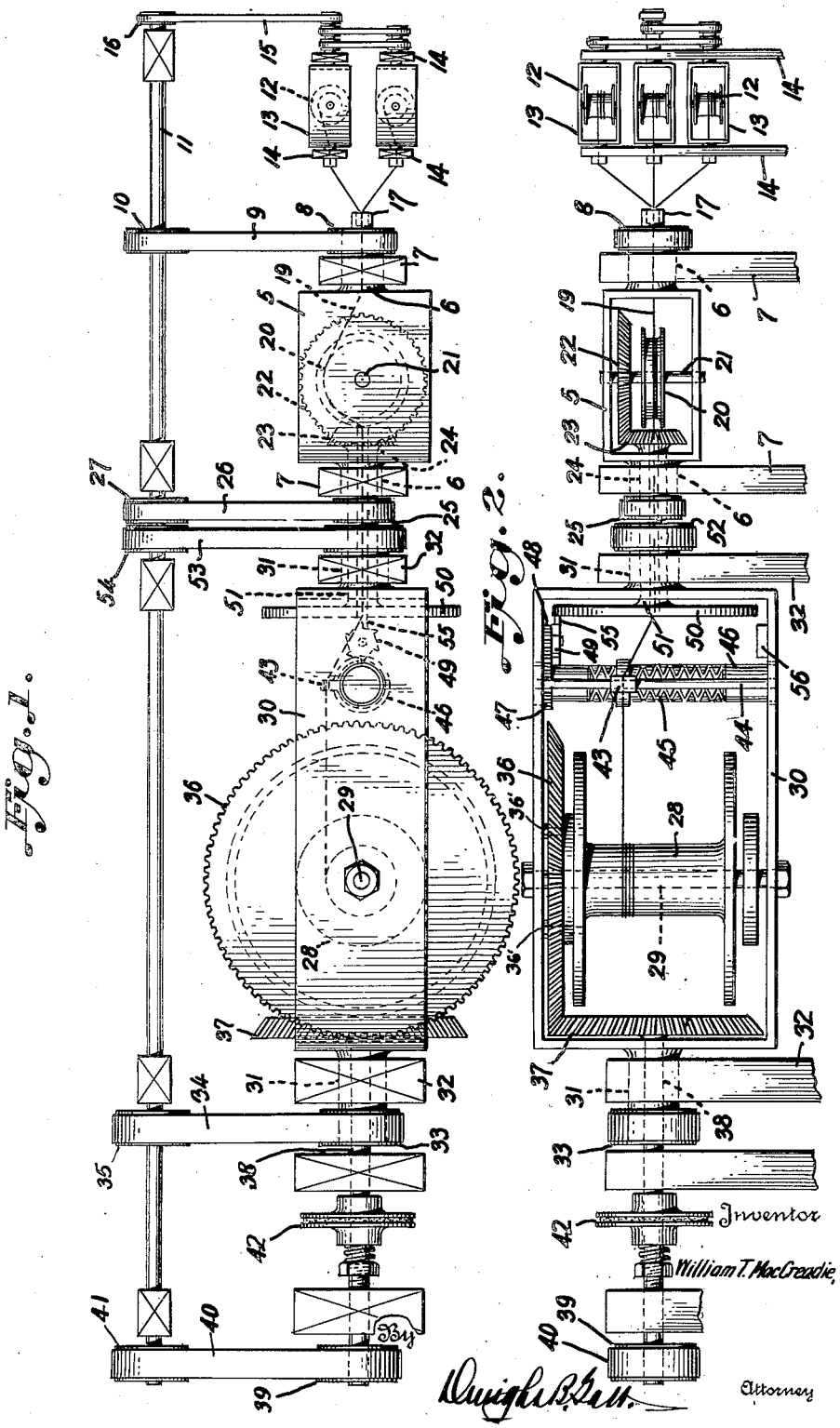

2,506,230

UNITED STATES PATENT OFFICE 2,506,230

WIRE ROPE MANUFACTURING MACHINE

William T. MacCreadie, Lewisburg, Pa., assignor, by mesne assignments, to Sunbury Wire Rope Manufacturing Company, Sunbury, Pa., a corporation of Pennsylvania Application September 15, 1947, Serial No. 774,159

6 Claims. (Cl. 57—71)

This invention is a wire rope making machine, and pertains particularly to that type of machine involving mechanism for producing a rope or cable in which a plurality of wires are wrapped or twisted together to provide an elongated strand.

An object of the invention is to provide a machine of simple construction for the production of small cables involving relatively few strands, and wherein the completed cable may be produced rapidly and by the use of simplified operations.

A further object of the invention is to provide a small strander cable machine of simplified and compact construction, which involves less parts, gears and shafts than have heretofore been required, which is rapid in its operation, and which is capable of producing small strand cable with a minimum of energy, as well as at a minimum of cost.

With the foregoing objects in view, together with others which will appear as the description proceeds, the invention consists in the novel construction, combination and arrangement of parts, all as will be described more fully hereinafter, illustrated in the drawings, and particularly pointed out in the claims.

In the drawing:

Fig. 1 is a top plan view of a cable manufacturing machine embodying the invention, and Fig. 2 is a side elevation thereof.

Referring now more particularly to the drawing, reference will first be made to the haul-off structure. This structure includes a carriage 5 of substantially rectangular shape, having outwardly projecting hollow trunnions 6 at its ends rotatably mounted in suitable bearings upon posts or supports 7. This frame is supported in its bearings for rotation upon a horizontal axis. One of the trunnions 6 has secured thereto a pulley 8 over which passes a belt 9 engaged over a pulley or drive wheel 10 affixed to the power or countershaft 11. The wire strands to be formed into the cable are carried by spools or bobbins 12 rotatably mounted in their supporting frames 13 which, in turn, are rotatably supported in suitable bearings upon posts 14. Rotative movement of these spool frames is brought about by the pulley and belt structure shown, powered by a belt 15 passing over a pulley 16 upon the power shaft 11. The strands leading from the spools 12 pass through the die 17 disposed in advance of the haul-off drum as usual, so that the cable in its preliminary twisted form passes as such, indicated at 19, to the haul-off drum 20 secured upon shaft 21 transversely mounted within the haul-off carriage 5.

The shaft 21 has affixed thereto near one of its ends a bevel gear 22 which is in mesh with a similar gear 23 disposed axially of the carriage and coaxial with the hollow trunnions 6. A shaft 24 affixed to bevel gear 23 passes through the trunnion 6 at the delivery end of the haul-off carriage and has bearing within said trunnion. The outer end of the said bevel gear shaft has affixed thereto a pulley 25 over which passes a belt 26 engaged around a pulley 27 affixed to the power shaft 11.

It will here be noted that the speed of rotation of the haul-off carriage does not govern the speed of rotation of the haul-off drum mounted therein, as the carriage and the said drum are driven by power means independent of one another.

The wind-up bobbin 28 is mounted upon a shaft 29 disposed transversely of a wind-up bobbin cradle or frame 30, the ends of which are provided with outwardly extending hollow trunnions 31 rotatably mounted in supporting posts 32. One of these trunnions has affixed thereto a pulley 33 over which passes a belt 24 engaged over a pulley 35 affixed to the power shaft 11.

The shaft 29 which supports the wind-up bobbin 28 has loosely mounted near one end thereof a bevel gear 36 secured as at 36' to bobbin 28, which gear is in mesh with a similar gear 37 affixed to a sectional shaft 38 which passes through and has bearing in one of the hollow trunnions 31, and this shaft 38 has affixed to the far end thereof a pulley 39 over which passes a belt 40 similarly engaged with a pulley 41 affixed to the power shaft 11. The shaft 38 has arranged therein a friction clutch of conventional form indicated generally at 42.

Arranged transversely within the wind-up bobbin frame or cradle 30 and in advance of the bobbin 28 therein, is feed mechanism for winding the finished cable properly upon the bobbin 28. This feed mechanism includes a feeder element 43 slidably mounted upon a bar 44 disposed transversely within the wind-up bobbin frame. This feed member 43 has operative engagement with the double threads 45 in the surface of a feed screw 46 rotatably mounted within the bobbin frame 30 and parallel with the bar 44. The feed screw and the association of the feeder member therewith for back and forth movement are well known in the art and further description of their construction and operation is believed unnecessary.

The reversing screw 46 has affixed to one of its ends a gear 47, in mesh with a gear 48 secured to the frame or cradle 30, and a ratchet wheel 49 is affixed to the gear 48.

Rotatably mounted within the frame or cradle 30 at the intake end thereof is a disk 50, the same being supported by a hollow shaft 51 having bearing in trunnion 31 of the cradle or frame 30. The outer end of the shaft 51 has affixed thereto a pulley 52 over which passes a belt 53 having engagement with a pulley 54 affixed to the power shaft 11.

The inner face of the disk 50 carries a pawl 55 so positioned that as the disk rotates it engages the teeth of the ratchet 49 once each revolution of the disk. The arrangement is such that the reversing screw 46, through its gears 47 and 48, the ratchet wheel 49 and the pawl 55 is moved in a step by step manner and at a speed governed by the speed of rotation of the disk 50. This speed will be determined by the size of the belt pulleys 52—54. It will also be understood that the feed member or follower 43 will move back and forth upon its supporting bar 44 in advance of the wind-up bobbin 28 and at a speed commensurate with the speed of rotation of disk 50.

The speed of rotation of the wind-up bobbin 28 will be governed by the speed of rotation of shaft 38, to be determined by the size of pulleys 39—41. The friction brake or clutch 42 will stabilize or regulate the speed of shaft 38. The speed of rotation of the cradle or frame 30 which supports the wind-up bobbin and the cable feed mechanism will be determined by the size of the pulleys 33—35 through which power is transmitted to the hollow trunnion 31.

A weight 56 may be provided in the bobbin cradle or frame 30 for balancing purposes.

From the foregoing, it will be observed that I have provided what may be termed a small strander which involves relatively few parts, which parts are of simple construction and of easy assemblage, which are so assembled and co-ordinated as to permit of a wide latitude of relative speeds of movement of the various parts involved. By the use of a strander constructed in this manner, it is apparent that it may be made to operate rapidly, at the same time very efficiently to produce a perfect relatively small strand cable at a minimum of cost and with the least possible expenditure of energy.

I claim:

1. In a wire rope manufacturing machine, a wind-up bobbin, means for rotating said bobbin, a friction clutch in said bobbin rotating means, a feed member movable back and forth in advance of said bobbin to feed a strand to the latter, and means for operating and governing the speed of said feed member.

2. In a wire rope manufacturing machine, a bobbin cradle, means for rotating said cradle, a wind-up bobbin rotatably mounted in and supported by said cradle, means for rotating said bobbin, automatically operating speed variable mechanism in said bobbin rotating means, a feed member in said cradle movable back and forth in advance of said bobbin to feed a strand to the latter, and means governing the speed of said feed member.

3. In a wire rope manufacturing machine, a rotatably mounted wind-up bobbin frame, means for rotating said frame, a bobbin shaft disposed transversely of said frame and rotatable therein, means for rotating said bobbin shaft, a bar disposed in said frame parallel with said bobbin shaft, a feed screw parallel with said bar and shaft, a feed member slidably mounted on said bar, a connection between said feed member and said screw, and means for rotating said screw in a step by step manner.

4. In a wire rope manufacturing machine, a rotatably mounted wind-up bobbin frame, means for rotating said frame, a wind-up bobbin disposed transversely within said frame, means for rotating said bobbin, a bar within said frame disposed parallel to said bobbin, a screw member rotatably mounted in said frame parallel with and adjacent to said bar, a guide member slidably mounted upon said bar, a connection between said guide member and the threads of said screw, a gear affixed to said screw, a ratchet member for rotating said gear, and means for driving said ratchet member.

5. In a wire rope manufacturing machine, a rotatably mounted wind-up bobbin frame, means for rotating said frame, a wind-up bobbin rotatably mounted within and transversely of said frame, means for rotating said bobbin, a guide member mounted to travel parallel with the axis of said bobbin, a screw member in said frame to move said guide member, a disk rotatably mounted within said frame, a ratchet drive connection between said disk and said screw, and means for rotating said disk.

6. In a wire rope manufacturing machine, a bobbin cradle, means for rotating said cradle at a predetermined speed, a wind-up bobbin rotatably mounted in and supported by said cradle, a gear on said cradle to drive said bobbin, a rotatable shaft, a drive connection between said shaft and said gear, and a friction clutch in said shaft.

WILLIAM T. MacCREADIE.

REFERENCES CITED

The following references are of record in the file of this patent:

UNITED STATES PATENTS

| Number | Name | Date |
| --- | --- | --- |
| 251,429 | Gade | Dec. 27, 1881 |
| 691,798 | Norman | Jan. 28, 1902 |
| 806,068 | Cuzner | Nov. 28, 1905 |
| 895,440 | Dooley | Aug. 11, 1908 |
| 1,847,455 | Webb | Mar. 1, 1932 |
| 2,000,104 | Somerville | May 7, 1935 |
| 2,329,130 | Nelson et al. | Sept. 7, 1943 |
| 2,342,343 | Hotchkiss, Jr. | Feb. 22, 1944 |
| 2,347,632 | Hotchkiss, Jr. | Apr. 25, 1944 |
| 2,447,345 | Kovacs | Aug. 17, 1948 |

FOREIGN PATENTS

| Number | Country | Date |
| --- | --- | --- |
| 6,001 | Great Britain | of 1830 |